April 2, 1929.  L. C. MARTINSEN  1,707,635
MOTOR VEHICLE DRIVING MECHANISM
Filed Jan. 7, 1928

INVENTOR.
Leonard C. Martinsen
BY
ATTORNEY.

Patented Apr. 2, 1929.

1,707,635

UNITED STATES PATENT OFFICE.

LEONARD CHRISTIAN MARTINSEN, OF KIMBALLTON, IOWA.

MOTOR-VEHICLE DRIVING MECHANISM.

Application filed January 7, 1928. Serial No. 245,167.

The invention relates to driving mechanisms for motor driven vehicles, and has for its object to provide a device of this character which will obviate the use of change speed gears in a transmission, as is now the practice, utilizing a differential mechanism and brake and clutch means in connection with the operation thereof for controlling the same.

A further object is to provide a differential formed from friction gears and having a friction disc with which a governor controlled drive gear engages, and which drive gear is automatically moved outwardly and inwardly by centrifugal governors for regulating the speed of operation of the vehicle.

A further object is to provide the transmission differential casing with a drum around which a contractible brake band extends and a lever means for controlling the clutch and simultaneously contracting the band for breaking the momentum of the drum, thereby simultaneously declutching and stopping the rotation of the parts.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
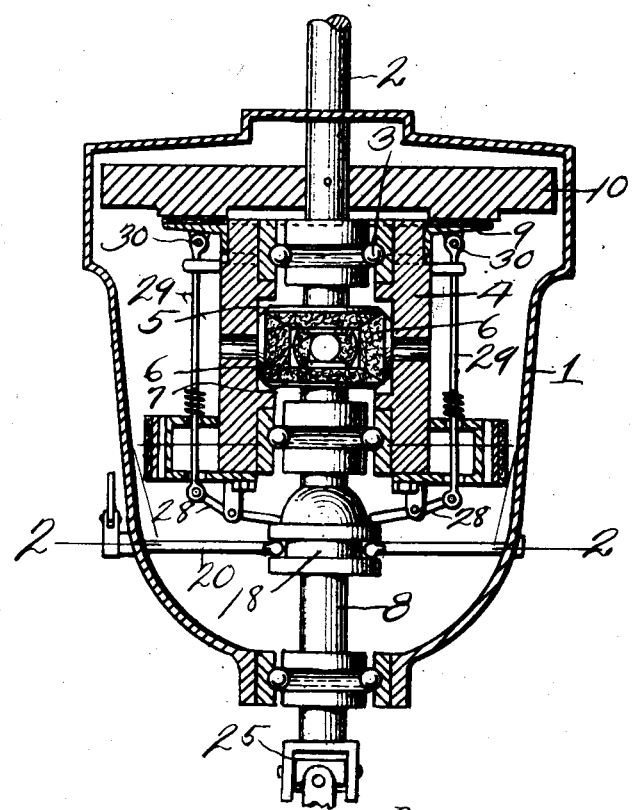
Figure 1 is a horizontal sectional view through the friction transmission.
Figure 2:
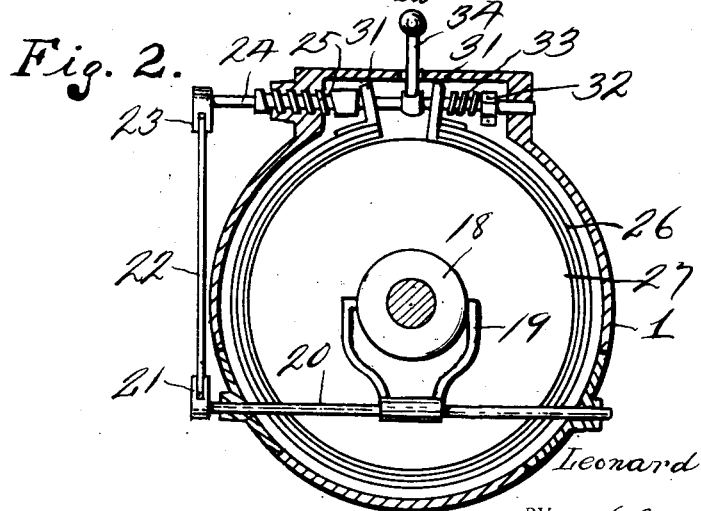
Figure 2 is a vertical transverse sectional view through the transmission taken on line 2—2 of Figure 1.

Referring to the drawings, the numeral 1 designates the casing of the transmission, into which the drive shaft 2 extends, which leads from any conventional form of engine. Drive shaft 2 is provided with an antifrictional bearing 3 within one end of the rotatable drum 4, and terminates in a bevelled friction gear 5, which engages the intermediate idle friction gears 6 within the drum, and which idle friction gears 6 engage the friction gear 7 carried by the driven shaft 8, therefore it will be seen that under normal conditions with the plate clutch 9 out of engagement with the fly wheel 10 carried by the drive shaft 2, the friction gears will idle. When the gears are locked for rotating the differential transmission for instance when the disc clutch 9 is in clutched relation to the fly wheel 10, the friction gears 5, 6 and 7 will be locked together, thereby imparting rotation to the drive shaft 8, which leads rearwardly to a conventional differential not shown.

Slidably mounted on the drive shaft 8 is a sleeve 18, which is controlled by a fork 19, and which fork is carried by a transversely disposed shaft 20, one end of which is provided with an arm 21 having a link connection 22 with the arm 23 of a rock shaft 24, and which rock shaft is provided with screw means 25, whereby when it is rocked it will contract a brake drum 26 extending around the drum 27 for braking and stopping the rotation of the drums 27 and 4 simultaneously with a declutching of the disc brake 9 in relation to the fly wheel 10. The simultaneous declutching is accomplished by means of rock levers 28 which have connected thereto rods 29, which rods are pivotally connected at 30 to the disc 9, therefore it will be seen that a simultaneous declutching and braking operation is accomplished through the medium of the contractible band 26. Rock shaft 24 extends through the ears 31 of the contractible band 26 and interposed between a nut 32 on the rockshaft 24 and one of the ears 31 is a coiled spring 33 which holds said last named ear against movement during the contracting operation upon rocking of the shaft 24, which shaft is provided with an operating lever 34 adapted to be grasped by the operator.

From the above it will be seen that a vehicle driving mechanism is provided wherein change speed gears is obviated and wherein automatic adaptation of speed to varying conditions of roadway and load is possible.

The invention having been set forth what is claimed as new and useful is:

A vehicle drive mechanism comprising a transmission, a differential gearing in said transmission, a driven fly wheel, a disc clutch connection between the transmission and fly wheel adjacent one end of the transmission, a drum carried by the transmission and rotatable therewith, a contractible brake band around the drum, a rock shaft for contracting the band, a slidable collar axially of the transmission, slidable rods connected to the disc brake and extending through the drum, means whereby upon rocking of the rock shaft said collar will be moved towards and away from the transmission and pivoted levers carried by the drum and connected to the rod and in the path of the slidable collar.

In testimony whereof I hereunto affix my signature.

LEONARD CHRISTIAN MARTINSEN.